July 19, 1955 H. E. MATHEWS 2,713,405
SPEED CHANGER WITH CLUTCH MECHANISM
Filed May 28, 1951
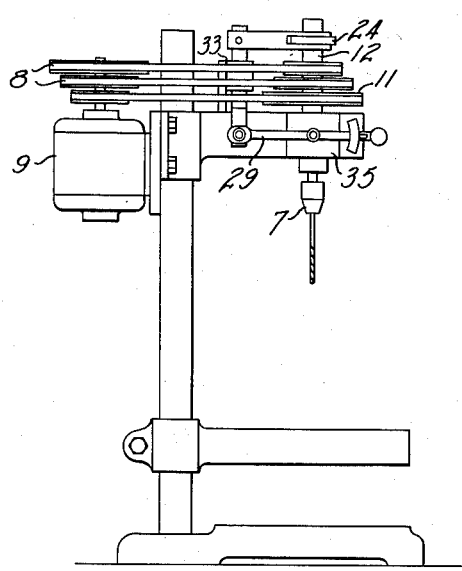
Fig-1
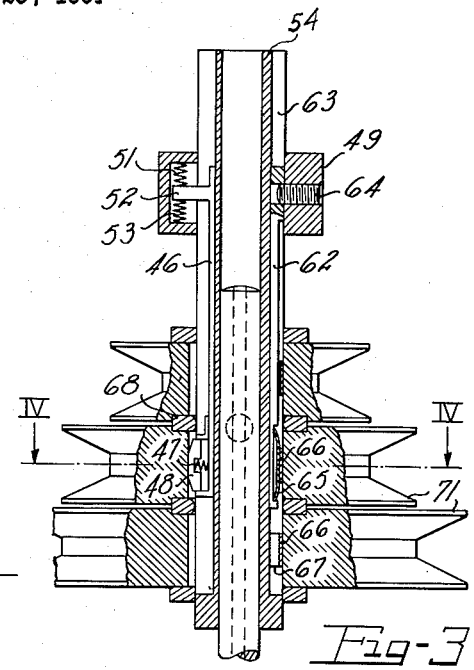
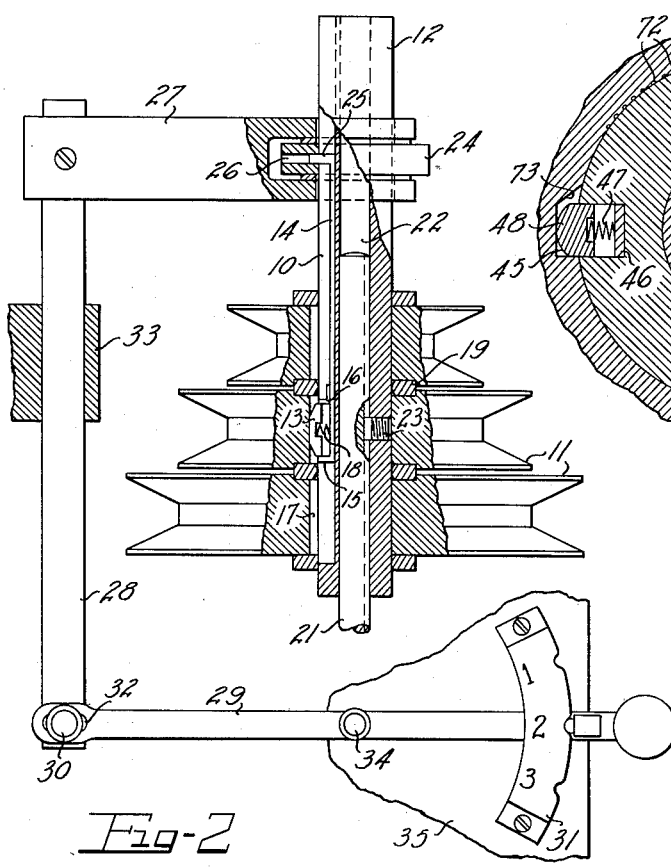
INVENTOR
Homer E. Mathews

United States Patent Office 2,713,405
Patented July 19, 1955

2,713,405

SPEED CHANGER WITH CLUTCH MECHANISM

Homer E. Mathews, West Allis, Wis.

Application May 28, 1951, Serial No. 228,633

5 Claims. (Cl. 192—53)

This invention relates in general to speed changers, and more particularly, to clutch mechanisms for pulleys or gears. The invention is applicable to pulley or gear mechanisms and reference hereafter to pulleys will be considered to include gears.

The provision of a clutch for pulley mechanisms of small power tools involves problems of structure and economy. While it is desirable to provide selective clutching action for each of a plurality of pulleys which then may individually drive the power tool, it is imperative that the entire assembly be as simple in construction as possible. The clutch should provide positive engagement between the pulleys and their rotating shaft or spindle so that there will be no slipping of the pulleys relative to their spindle. Also, in some tools such as drill presses the clutch mechanism must not interfere with the axial feed of the tool drive shaft in the longitudinal bore of the pulley spindle. For other tools the pulley spindle unless unreasonably large cannot be made with an axial bore because of the tortional stresses thereof.

Therefore, in accordance with this invention, I provide a simple clutch structure which is easily and safely moved along the outer surface portion of the pulley spindle. The clutch is made to engage with the pulleys with a snap action and to disengage therefrom as a result of cooperative action of bearings between pulleys with the locking member of the clutch. When necessary the clutch action is coordinated with means tending to reduce the relative speed of a pulley and its spindle.

One object of this invention is to provide an improved clutch of simple construction and operation for selectively engaging rotatable pulley driving members with their common shaft or spindle.

A more detailed object is to provide a snap action to a clutch which engages pulleys in a non-slipping relationship with their spindle, without interfering with the axial movement of a tool shaft in the bore of the spindle.

Another object is to provide a clutch engageable selectively and individually with a plurality of rotating members whereby bearings separating those rotating members actuate the clutch disengaging action.

Still another object is to coordinate speed synchronizing with a snap acting locking member to insure positive and safe action of a clutch for varying the speed of rotation of drive shafts of rotating devices.

These and other objects and advantages of this invention will become apparent from a consideration of the accompanying drawing, in which: Fig. 1 illustrates a drill press embodying this invention. Fig. 2 is an enlarged view partly in section of the speed changer embodied in the pulley drive assembly of Fig. 1. Fig. 3 illustrates the embodiment of a modification of this invention in a pulley drive assembly, and Fig. 4 is a sectional view taken along line IV—IV of Fig. 3, with only a part of one of the pulleys shown.

For purposes of illustration the invention is shown as embodied in a pulley drive assembly for a drill press which has a plurality of belt driven pulleys of varying pitch. The drill 7 is connected through the drives 8 the motor 9. It is apparent that the drill may have several speeds if the pulleys are engaged in driving relationship with the drill one at a time. By providing a simple but efficient clutch for selective engagement of the pulleys, the belts may be left on the pulleys at all times. The pulley not operatively engaged with the drill shaft will be free to rotate while the belts are left engaged therewith, and the speed change of the tool can then be quickly accomplished merely by moving the clutch to provide the selective speed control.

In this instance, the clutch member for selectively engaging and locking pulleys 11 with the spindle 12 is the key 13 which is provided with translatory motion in the longitudinal slot 10 of the outer surface portion of the spindle 12. In the engaged position shown, the key is biased or urged by a spring 18 so that a portion of the key extends into a keyway 17 of the pulley 11. While the keyways of the pulleys are illustrated as being aligned, it is obvious that once the pulley drive assembly has been operated the keyways will no longer be aligned. The clutch, therefore, is provided with means to move the key from one pulley to the next pulley in spite of the non-alignment of the keyways.

For this purpose, I have made the bearing 19 between the pulleys to cooperate with the key so that the key can be moved or cammed out of engagement with a pulley and into the position of another pulley irrespective of the relative speeds of the pulleys or the position of their respective keyways. The inner portions of the bearings 19 are crowned and bear on the tapered end edge surface of the key to force the key against the spring 18 thereby moving the key into the spindle as the key is moved past the bearing. Movement of the key along the spindle and past the bearing is effected by the rod 14. The key will remain in the spindle slot, urged by the spring 18 outwardly against the inner peripheral surface of the pulley causing a drag on the pulley until the key aligns with the pulley keyway and snaps into engagement therewith.

The snap movement of the key laterally of the spindle into a keyway is guided so that the key does not cock as it moves past the bearing 19. One mode of maintaining the proper lateral movement of the key to prevent cocking thereof is to provide the motor rod 14 with a pair of rails 15, 16, placing one of the rails along each end of the key as a guide.

The very simplicity of the clutch which has been described is evidence of its complete adaptability and efficiency. The driving torque of the pulley, which in this instance is the driving member, is transmitted to the spindle through the clutch key, and the spindle turns a shaft 21 to which it is rotatably connected by the set screw 23. As previously mentioned, the clutch, although providing for selectively locking the pulleys to the spindle, does not interfere with the necessary feed of the drill shaft 21 in the axial bore 22 of the spindle 12. The clutch in no way obstructs the movement of the shaft along the entire length of the axial bore.

The illustration of Fig. 2 also shows how the motor rod 14 is actuated. In this instance, the upper end 25 of the rod projects laterally forming a tang which extends into a radially disposed hole 26 in the collar 24 so that the rod may be moved by the collar which has a clearance fit on the spindle.

While the rod can be operated by hand by moving the collar, it is preferable to provide a remote control operating lever for engaging and disengaging pulleys to avoid hazards to the operator which would result from his reaching over the pulleys and belts to the collar 24. One means for providing a remote control lever is shown with the collar being moved by the lever 29 which is located in a safe position below the pulleys. An indicator 31 is associated with the lever to show which pulley is engaged with the spindle. Mechanical linkage connects the control lever to the collar. This linkage includes an arm 27 having a bifurcated end in which the collar 24 is received so that the arm and collar move together. The opposite end of the arm 27 is fixed by suitable means, as by a bolt, to the upper end of a connecting rod 28, which can be reciprocated in a stationary guide 33. At the lower end of the connecting rod there is a pin 30 which cooperates with an elongated slot 32 in one end of the control lever 29. The connecting rod is reciprocated in the stationary journal support 33 by the lever 29, which pivots about member 34 on the drill support 35. The reciprocating connecting rod imparts translatory motion to rod 14 and to the key 13 moving the key as desired to any pulley. The movement of the key from one pulley to another may be accomplished without stopping the motor 9 of the drill.

Also, while the speed change will generally be made by moving the clutch from one pulley to the next pulley, it is not necessary that the speed change be made that way. The shift can, if desired, be made by moving the clutch from any one pulley to any other pulley without stopping at the intermediate pulleys. The key, if moved quickly, as is possible with this clutch mechanism, may shift from one end pulley to the opposite end pulley without stopping intermediate the end pulleys.

The modification shown in Figs. 3 and 4 illustrates how the spindle and pulley speeds can be made to substantially synchronize and how the means for synchronizing is made to coordinate with the motor rod for the clutch key so that when a speed change is desired the freely rotating idler pulley which is to be engaged with the spindle will first have its speed of rotation substantially synchronized with the speed of the spindle; that is, the relative speed of the two members will be substantially reduced. Then the key will be moved into the engagement with the pulley.

As in the embodiment of Fig. 2 the key 48 is biased by a spring 47 and moved by rod and collar 46 and 49 respectively. However, in the embodiment of Figs. 3 and 4 there are springs 51, 53 on opposite sides of the tang or laterally bent portion 52 of the rod 46. These springs are retained between the tang and the walls of the collar. When the collar is moved, a delay or lost motion is provided before the rod 46 is caused to move as one of the springs 51 or 53 compresses. The action of the springs in the collar to delay the movement of the key is aided by the bearing 68. When the key 48 starts to move, the end thereof will abut against the inner portion of one of the bearings. This abutment will restrain the movement of the key momentarily and insure full compression of one of the springs depending on which direction the key is moved. The bearing will then cam the key into the slot in the spindle 54, into what may be defined as a neutral position, prior to the engagement of the clutch key with the next pulley. The key will remain in that neutral position until the key aligns with the next pulley and actually engages the keyway of the next pulley. When the key is in that neutral position, the compressed spring in the collar will frocefully snap the key along the spindle into alignment with the next pulley so that the key can engage the keyway of the next pulley as it moves laterally out of its neutral position. Since the compression of the spring in the collar will be released, the speed changer will again be ready for movement in either of the two directions with coordinated action of the key and synchronizer described below.

The delay or lost motion referred to provides for the movement of a synchronizing member located on the opposite side of the spindle 54 prior to the movement of the key 48. In this instance, the synchronizer comprises a motor rod 62 which slides along a slot 63 in the spindle. The upper end of the motor rod 62 is fixed to the collar 49 by a set screw 64 so that the motor rod is moved immediately when the collar is moved.

The lower end of the motor rod has a leaf spring 65 which is curved outwardly and which will cause frictional engagement with the inner peripheral surface of the pulley thereby providing a second clutch means tending to reduce the relative speed of the pulley and the spindle. The frictional engagement of the inner surface of the pulleys is not necessarily between the leaf spring 65 and the surface of the pulley, but may be caused by the leaf spring urging a clutching member or friction plate 66 against the pulley. One of the clutching members may be provided for each pulley. Those members are retained in recesses 67 in the spindle and are axially spaced from each other.

The coordinated action of the friction plates and the key, provided by the delay of the movement of the key until after the friction member has acted, will substantially reduce the relative speed of the spindle and pulley before their engagement through the key. That coordinated action will work as follows: when the spring in the collar is compressing and before the key has been moved to its neutral position, the frictional engagement of the synchronizer or the friction member with the next pulley will have been initiated. This means that prior to disengagement of the key, the synchronizer has already frictionally engaged with the next pulley. Then, when the key moves to its neutral non-engaging position, the synchronizer effects a reduction in the relative speed of the spindle and the pulley, and with the key in alignment with the next pulley the relative speed of that pulley and the spindle will reduce sufficiently so that key will engage the pulley keyway.

There is disclosed in Fig. 4 additional modes by which the relative speed of the two members is reduced, and these modes may be coordinated with the structure of Fig. 1 or 2. A portion of the inner surface of the pulley 71 is notched or corrugated at 72 without substantially reducing the bearing surface of the inner periphery of the pulley. As the key moves along the corrugated portion there will be a frictional clutching action caused by the abutment of the key with the corrugations as the key is urged outwardly by the bias spring. This will tend to reduce the relative speed of the pulley and spindle. Also, as shown in Fig. 4 the keyway may be widened or tapered on one side 73 so that the key more quickly extends into the keyway.

In some instances the relative speed of the spindle and a selected pulley may be so great that the key does not have sufficient time to snap into the keyway until after a considerable reduction in their relative speed. Having in mind this possibility the key is provided with the curved convex outer surface 45 shown in cross section in Fig. 4 whereby the keyway and the key will act as a cam and follower to snap the key back into the spindle if the relative speed is too great. This cam action of the key will also tend to cause the pulley and spindle to assume almost the same rotational speed so that the key can fully engage the pulley, in which position the curved surface 45 will be completely in the keyway and the flat sides of the key will be abutted by flat sides of the keyway and of the slot. Since the torque of the driving member is transmitted to the driven member through the key, it can be seen that unless there is abutment of flat sides of the pulley and spindle against a flat side of the key, the driven member is likely to slip with respect to the driving member. Such a disadvantage is avoided in the clutch described which provides non-slipping engagement of the driving and driven members through the key as described.

It is claimed and desired to secure as Letters Patent:

1. In combination, a spindle having an axial bore, a shaft slidable in said bore and splined to said spindle, a plurality of pulleys on said spindle, said spindle having a first and second slot extending lengthwise along the outer surface thereof, each of said pulleys having a keyway in its inner surface extending transversely thereof parallel to the lengthwise direction of said slots, a first rod having a key and being movable along said first slot, said key biased to extend into said keyways to engage one of said pulleys with said spindle, means between adjacent of said pulleys forcing said key out of engagement with said keyways when said key is moved between said pulleys along said slot, a second rod movable along said second slot, clutch means carried by said spindle and disposed along said second slot, said second rod engageable with said clutch means to force said clutch means into friction engagement with any one of said pulleys to synchronize the speed of any one said pulleys prior to its engagement with said spindle, and actuating means for moving said rods including means for providing lost motion of the first of said rods whereby said second rod is moved to tend to synchronize the speed of one of said pulleys with said spindle preparatory to moving said key to engage with said one pulley.

2. In combination, a spindle, a plurality of pulleys on said spindle, said spindle having a first and second slot extending lengthwise along the outer surface thereof, each of said pulleys having a keyway in its inner surface extending parallel to the lengthwise direction of said slots, a first rod having a key and being movable along said first slot, said key extending laterally of said spindle into said keyways to engage any one of said pulleys with said spindle, a second rod movable along said second slot, clutch means carried by said spindle and movable by said second rod to be selectively frictionally engaged with any one of said pulleys having motion relative to said spindle to reduce that relative motion.

3. In combination, a spindle, a plurality of pulleys on said spindle, said spindle having a first and second slot extending lengthwise along the outer surface thereof, each of said pulleys having a keyway in its inner surface extending parallel to the lengthwise direction of said slots, a first rod having a key and being movable along said first slot, said key extending laterally of said spindle into said keyways to engage any one of said pulleys with said spindle, a second rod movable along said second slot, said spindle having a plurality of recesses spaced along said second slot with each of said recesses being adjacent the inner surface of a corresponding one of said pulleys, a clutch member disposed in each of said recesses, said second rod carrying means for selectively causing any one of said clutch members to be frictionally engaged with its said corresponding pulley.

4. In combination, a spindle, a plurality of pulleys on said spindle, said spindle having a first and second slot extending lengthwise along the outer surface thereof, each of said pulleys having a keyway in its inner surface extending parallel to the lengthwise direction of said slots, a first rod having a key and being movable along said first slot, said key extending laterally of said spindle into said keyways to engage any one of said pulleys with said spindle, a second rod movable along said second slot, clutch means carried by said spindle and movable by said second rod to be selectively frictionally engaged with any one of said pulleys having motion relative to said spindle to reduce that relative motion, and an actuating means for moving both of said rods in either direction axially of said spindle including lost motion means associated with said first rod whereby said second rod is moved prior to movement of said first rod and said key.

5. In combination, a spindle, a plurality of pulleys on said spindle, said spindle having a first and second slot extending lengthwise along the outer surface thereof, each of said pulleys having a keyway in its inner surface extending parallel to the lengthwise direction of said slots, a first rod having a key and being movable along said first slot, said key biased to extend with a snap action into said keyways to engage any one of said pulleys with said spindle, means between adjacent of said pulleys forcing said key out of engagement with said keyways when said key is moved between said pulleys along said first slot, a second rod movable along said second slot, clutch means carried by said spindle and movable by said second rod to cause frictional engagement with any one of said pulleys having motion relative to said spindle to reduce the relative motion, and an actuating means for moving both of said rods including lost motion means associated with said first rod whereby said second rod is moved prior to moving said first rod and said key.

References Cited in the file of this patent
UNITED STATES PATENTS

| | | |
|---|---|---|
| 1,245,315 | Campbell | Nov. 6, 1917 |
| 2,273,807 | Woytych | Feb. 17, 1942 |
| 2,474,789 | Perhacs | June 28, 1949 |
| 2,566,579 | Nichols | Sept. 4, 1951 |